(12) United States Patent  
Manzoor

(10) Patent No.: US 9,945,439 B2  
(45) Date of Patent: Apr. 17, 2018

(54) ELASTOMER STRIP DESIGN FOR TORSIONAL VIBRATION DAMPERS AND TORSIONAL VIBRATION DAMPERS HAVING SAME

(71) Applicant: Suhale Manzoor, Plymouth, MI (US)

(72) Inventor: Suhale Manzoor, Plymouth, MI (US)

(73) Assignee: Dayco IP Holdings, LLC, Troy, MI (US)

( * ) Notice: Subject to any disclaimer, the term of this patent is extended or adjusted under 35 U.S.C. 154(b) by 79 days.

(21) Appl. No.: 14/996,526

(22) Filed: Jan. 15, 2016

(65) Prior Publication Data

US 2016/0208878 A1     Jul. 21, 2016

Related U.S. Application Data

(60) Provisional application No. 62/104,358, filed on Jan. 16, 2015.

(51) Int. Cl.
*F16D 3/00*     (2006.01)
*F16H 55/14*    (2006.01)
(Continued)

(52) U.S. Cl.
CPC ............ *F16F 1/373* (2013.01); *B29C 43/02* (2013.01); *B29C 43/36* (2013.01); *F16H 55/36* (2013.01);
(Continued)

(58) Field of Classification Search
CPC .......... Y10T 74/2131; F16H 2055/366; F16H 55/36; F16F 15/126; F16F 15/1442
(Continued)

(56) References Cited

U.S. PATENT DOCUMENTS 1,871,480 A * 8/1932 Tibbetts .............. F16F 15/1442
                                                    464/68.2
1,928,763 A * 10/1933 Rosenberg .............. F16D 3/76
                                                    29/450
(Continued)

FOREIGN PATENT DOCUMENTS

FR        1212234       3/1960
GB         820042       3/1960
(Continued)

OTHER PUBLICATIONS

Zhan, Chengqi et al.; "Models and Algorithms"; Association Rule Mining, LNAI 2307 Tutorial; ISSN 0302-9743; p. 132, Casual Rule Analysis (2002).

(Continued)

*Primary Examiner* — Henry Y Liu
(74) *Attorney, Agent, or Firm* — FisherBroyles, LLP; Susan M. Oiler

(57) ABSTRACT

Elastomer members for a torsional vibration damper, methods of making the same, and torsional vibration dampers having the elastomer members are disclosed. The elastomer members have a first major surface and an opposing second major surface with opposing side joining the first major surface to the second major surface, have a median sagittal plane extending parallel to the first major surface and the second major surface, and a transverse plane perpendicular to the median sagittal plane. In a cross-sectional geometry in a plane bisecting the median sagittal plane and the transverse plane, a thickness of the elastomer member changes along the median sagittal plane in a direction parallel to the transverse plane with a first thickness at both opposing sides and a second thickness at the transverse plane, where the second thickness is greater than the first thicknesses.

18 Claims, 8 Drawing Sheets
(3 of 8 Drawing Sheet(s) Filed in Color)

(51) Int. Cl.
  *F16H 55/36* (2006.01)
  *F16F 1/373* (2006.01)
  *B29C 43/02* (2006.01)
  *B29C 43/36* (2006.01)
  *B29C 43/00* (2006.01)
  *B29K 7/00* (2006.01)
  *B29K 9/06* (2006.01)
  *B29K 19/00* (2006.01)
  *B29K 21/00* (2006.01)
  *B29L 31/00* (2006.01)

(52) U.S. Cl.
  CPC ........ *B29C 43/003* (2013.01); *B29K 2007/00* (2013.01); *B29K 2009/06* (2013.01); *B29K 2019/00* (2013.01); *B29K 2021/003* (2013.01); *B29L 2031/721* (2013.01); *F16H 2055/366* (2013.01)

(58) Field of Classification Search
  USPC ............................................ 474/94; 74/574.4
  See application file for complete search history.

(56) References Cited

U.S. PATENT DOCUMENTS

| | | | | | |
|---|---|---|---|---|---|
| 2,779,211 | A * | 1/1957 | Henrich | ............... | F16F 15/126 29/450 |
| 2,972,904 | A * | 2/1961 | Troyer | ............... | F16F 15/126 74/574.4 |
| 2,992,569 | A * | 7/1961 | Katzenberger | ...... | F16F 15/1442 74/574.4 |
| 3,479,907 | A * | 11/1969 | Hall | ............... | F16F 15/126 74/574.4 |
| 3,603,172 | A * | 9/1971 | Hall | ............... | F16F 15/173 188/379 |
| 3,707,031 | A * | 12/1972 | Hall | ............... | F16F 15/173 264/262 |
| 3,813,776 | A | 6/1974 | Frederickson et al. | | |
| 3,945,269 | A * | 3/1976 | Bremer, Jr. | ............... | 188/268 |
| 3,980,333 | A * | 9/1976 | Kasper | ............... | B60B 17/0041 295/11 |
| 3,986,747 | A * | 10/1976 | Raquet | ............... | B60B 17/0041 295/11 |
| 4,002,081 | A * | 1/1977 | Schultz, Jr. | ............. | F16H 55/48 29/892.1 |
| 4,083,265 | A * | 4/1978 | Bremer, Jr. | ......... | F16F 15/1435 74/574.2 |
| 4,085,937 | A | 4/1978 | Schenk | | |
| 4,262,553 | A * | 4/1981 | Bremer, Jr. | ......... | F16F 15/1435 74/574.2 |
| 4,318,309 | A * | 3/1982 | Bremer, Jr. | ......... | F16F 15/1435 74/574.4 |
| 4,378,865 | A * | 4/1983 | McLean | ............... | F16F 15/1442 188/379 |
| 4,395,809 | A * | 8/1983 | Whiteley | ............ | F16F 15/1442 188/378 |
| 4,803,029 | A * | 2/1989 | Iversen | ............... | B29C 37/0075 156/289 |
| 5,025,681 | A * | 6/1991 | Andra | ............... | F16F 15/1442 74/574.4 |
| 5,058,267 | A * | 10/1991 | Andra | ............... | F16F 15/1442 29/434 |
| 5,139,120 | A * | 8/1992 | Gomi | ............... | F16F 15/136 188/378 |
| 5,168,774 | A * | 12/1992 | Andra | ............... | F04D 29/263 464/89 |
| 5,231,893 | A * | 8/1993 | Sisco | ............... | F16F 15/126 74/574.4 |
| 5,429,619 | A | 7/1995 | Furnish | | |
| 5,441,456 | A * | 8/1995 | Watanabe | ............ | B21D 53/261 29/892.11 |
| 5,540,626 | A * | 7/1996 | Asai | ............... | F16F 15/124 474/178 |
| 5,591,093 | A * | 1/1997 | Asai | ............... | F16D 3/76 474/902 |
| 5,843,264 | A * | 12/1998 | Mabuchi | ............ | F16F 1/44 156/219 |
| 5,868,503 | A * | 2/1999 | Bade | ............... | F16C 27/066 384/536 |
| 6,106,421 | A * | 8/2000 | Graber | ............... | F16F 15/126 474/94 |
| 6,136,134 | A * | 10/2000 | Schwerdt | ............ | F16F 15/1203 156/294 |
| 6,171,194 | B1 * | 1/2001 | Haga | ............... | F16D 3/52 464/89 |
| 6,345,430 | B1 * | 2/2002 | Haga | ............... | F16D 3/52 29/458 |
| 6,358,349 | B1 * | 3/2002 | Christenson | ........ | F16F 15/1435 156/165 |
| 6,386,065 | B1 * | 5/2002 | Hodjat | ............... | F16F 15/126 474/94 |
| 6,684,735 | B2 * | 2/2004 | Watanabe | ............ | F16F 15/1203 428/450 |
| 7,048,661 | B2 * | 5/2006 | Shibata | ............... | F16D 3/68 464/73 |
| 7,166,678 | B2 * | 1/2007 | Dunlap | ............... | B32B 1/08 428/344 |
| 7,171,750 | B2 * | 2/2007 | Kano | ............... | F16F 15/126 29/451 |
| 7,354,637 | B2 * | 4/2008 | Tagawa | ............... | F16F 15/126 188/378 |
| 7,410,035 | B2 * | 8/2008 | Crissy | ............... | F16D 65/0006 188/218 A |
| 7,658,127 | B2 * | 2/2010 | Crist | ............... | F16F 15/126 74/572.2 |
| 7,972,129 | B2 * | 7/2011 | O'Donoghue | ......... | B29C 33/40 425/388 |
| 7,998,008 | B2 * | 8/2011 | Kamdem | ............ | F16D 41/206 474/161 |
| 8,070,632 | B2 * | 12/2011 | Yuan | ............... | F16D 3/74 464/89 |
| 8,202,183 | B2 * | 6/2012 | Riu | ............... | F16D 41/203 474/70 |
| 8,262,520 | B2 * | 9/2012 | Shimamura | ............... | F16D 3/12 464/71 |
| 8,308,368 | B2 * | 11/2012 | Blair | ............... | F16C 13/006 29/898.066 |
| 8,342,058 | B2 * | 1/2013 | Christenson | ............ | F16F 7/108 74/572.2 |
| 8,506,434 | B2 * | 8/2013 | Harvey | ............... | F16D 47/02 192/41 R |
| 8,715,121 | B2 * | 5/2014 | Cali | ............... | F16D 3/02 474/94 |
| 8,973,463 | B2 * | 3/2015 | Manzoor | ............... | F16F 7/108 464/180 |
| 9,121,471 | B2 * | 9/2015 | Manzoor | ............ | F16F 15/1442 |
| 9,273,773 | B2 * | 3/2016 | Vukojicic | ............... | F16H 55/36 |
| 9,505,177 | B2 * | 11/2016 | Fujioka | ............ | B29C 45/14221 |
| 9,605,744 | B2 * | 3/2017 | Mandel | ............... | B22F 3/12 |
| 9,644,731 | B2 * | 5/2017 | Vukojicic | ............... | F16H 55/36 |
| 2003/0035966 | A1 * | 2/2003 | Tagawa | ............... | F16F 15/126 428/450 |
| 2003/0199348 | A1 * | 10/2003 | Huber | ............... | F16D 3/68 474/94 |
| 2004/0067807 | A1 * | 4/2004 | Shibata | ............... | F16D 3/68 474/161 |
| 2004/0108639 | A1 * | 6/2004 | Kato | ............... | F16F 1/3842 267/141 |
| 2005/0050985 | A1 * | 3/2005 | Crissy | ............... | F16F 15/126 74/574.4 |
| 2005/0116401 | A1 * | 6/2005 | Kano | ............... | F16F 15/126 267/273 |
| 2006/0084541 | A1 * | 4/2006 | Nosaka | ............... | F16D 3/68 474/170 |
| 2007/0063378 | A1 * | 3/2007 | O'Donoghue | ......... | B29C 33/40 264/219 |
| 2007/0295569 | A1 * | 12/2007 | Manzoor | ............... | F16F 15/124 188/379 |

(56) References Cited

U.S. PATENT DOCUMENTS

| | | | |
|---|---|---|---|
| 2008/0283322 A1* | 11/2008 | Gruber | F16H 55/14 180/219 |
| 2009/0005201 A1* | 1/2009 | Shimamura | F16D 3/76 474/94 |
| 2009/0145261 A1* | 6/2009 | Obeshaw | F16F 15/126 74/574.4 |
| 2009/0197719 A1* | 8/2009 | Ali | F16D 7/021 474/94 |
| 2010/0255943 A1* | 10/2010 | Cali | F16H 55/48 474/94 |
| 2012/0094791 A1* | 4/2012 | Lee | F16F 15/126 474/94 |
| 2012/0231909 A1* | 9/2012 | Shin | F16F 15/126 474/94 |
| 2013/0068065 A1* | 3/2013 | Manzoor | F16F 7/108 74/574.4 |
| 2013/0095964 A1 | 4/2013 | Shin | |
| 2013/0291677 A1* | 11/2013 | Manzoor | F16F 15/1442 74/574.4 |
| 2014/0274508 A1* | 9/2014 | Crist | F16F 15/126 474/94 |
| 2015/0141182 A1* | 5/2015 | Mandel | B22F 3/12 474/94 |

FOREIGN PATENT DOCUMENTS

| | | |
|---|---|---|
| JP | 2007255432 | 10/2007 |
| JP | 2009008237 | 1/2009 |
| WO | 2011141799 | 11/2011 |

OTHER PUBLICATIONS

PCT, International Search Report and Written Opinion, Application No. PCT/US2015/035574 (dated Nov. 9, 2015).

U.S., Non-Final Office Action, U.S. Appl. No. 14/303,074 (dated Dec. 23, 2015).

PCT, International Search Report and Written Opinion, Application No. PCT/US2015/013566 (dated Mar. 30, 2016).

\* cited by examiner

ELASTOMER STRIP DESIGN FOR TORSIONAL VIBRATION DAMPERS AND TORSIONAL VIBRATION DAMPERS HAVING SAME

RELATED APPLICATIONS

This application claims the benefit of U.S. provisional application No. 62/104,358, filed Jan. 16, 2015, and incorporates the same by reference in its entirety.

FIELD OF DISCLOSURE

The present invention relates generally to torsional vibration dampers used in internal combustion powertrains and vehicle drivetrains, and more particularly to a vertically compression molded elastomer member for use in torsional vibration dampers, the elastomer member having a non-uniform thickness through its axial length with its maximum thickness generally at its axial center-point.

BACKGROUND

Torsional Vibration Dampers (TVDs) are useful in attenuating torsional vibrations inherent to rotating shafts, including but not limited to crank-shafts, drive-shafts, prop-shafts, and half-shafts utilized in automotive and non-automotive applications.

Commonly, a TVD consists of three components: (1) a rigid metallic bracket (hub) attaching the TVD to the rotating shaft with the vibratory problem; (2) an active inertial member (ring) oscillating opposite in phase to the vibrating shaft at a particular frequency, thereby reducing the resulting magnitude of the shaft vibration; and (3) an elastomeric member with two functions: (a) providing a spring damper thereby tuning the TVD to a particular frequency, and (b) locating the hub and the ring with respect to each other in the TVD.

Commonly, the hub and ring are metallic in construction due to the structural strength requirement for the hub and the inertial mass requirement for the ring (also known as an inertia member). The elastomeric member is first compression molded as a strip followed by assembly under compression between the hub and ring where it assumes an axis-symmetric ring like shape. At times the surfaces of the hub and ring that mate with the strip (profile) are coated with a primer-adhesive combination that causes the strip to be bonded to the aforementioned surfaces. The disclosed invention pertains to both bonded and non-bonded dampers as long as they employ a compression molded elastomer strip.

The elastomer used in the elastomer member could be one of several thermoset material alternatives, including but not limited to styrene butadiene rubber (SBR), poly butadiene (PBD); ethylene propylene diene monomer (EPDM); nitrile butadiene rubber (NBR), or any possible combination thereof. Furthermore, the elastomer could be one of several thermoplastic material alternatives, including but not limited to styrenic block copolymers (TPE-s), polyolefin blends (TPE-o), elastomeric alloys (TPE-v or TPV), thermoplastic polyurethanes (TPU), thermoplastic copolyester, and thermoplastic polyamides, or any possible combination thereof.

The main purpose for utilizing a TVD is to extend the fatigue life of the vibrating shaft by reducing the resulting amplitude at a particular frequency where the inertia ring counteracts the shaft vibration by oscillating with an enhanced magnitude but opposite in phase with the shaft vibration (vibratory influence). However, in many crank-shaft applications, the ring has poly-vee grooves for driving the serpentine belt of a front end accessory drive (FEAD) system, which may include, but is not limited to, an alternator, water-pump, fan, tensioners, and idler pulleys (load-bearing influence).

Due to the aforementioned loading scenarios, the elastomer members used in TVDs undergo two separate modes of loading: (1) normal loading caused by assembling the elastomer member under compression between the hub and ring; and (2) shear loading caused by the operation of the TVD both from vibratory and load-bearing influences.

To regulate the normal stress-strain bearing capacity of the elastomer member, the compression of the elastomer member and the profile geometry is designed to minimize the maximum principal stress and maximum principal strain buildup in the elastomer member post assembly.

To regulate the shear stress bearing capacity of the elastomer member, a threshold parameter called the slip-torque of the damper is established. The slip-torque is defined as the minimum value of quasi-static torque that causes the permanent angular slip across any elastomer metallic interface (either between the elastomer member and ring or between the elastomer member and hub).

It can be appreciated that the proper engineering of an elastomer member is a balance between maximizing the slip-torque capacity of the TVD (directly proportional to the compression of the elastomer member) while minimizing the principal stress-strain buildup (inversely proportional to the compression of the elastomer member). In the industry, a compression ratio of 30% to 40% is currently accepted as the norm where such a balance is obtained.

Furthermore, there is a constant effort by elastomer member manufacturers to increase production yield by simultaneously increasing the number of elastomer members produced per molding heat, while decreasing the time required for each molding heat.

This objective retains its value post-molding where secondary operations are avoided when possible. One such secondary operation relates to the removal of the flimsy residual elastomeric membrane (flash) present on the surface of the elastomer member visible post-assembly. Flash removal may be accomplished by grinding, cutting, cryogenically tumbling the elastomer members (de-flashing), or other methods known to one of skill in the art. This aforementioned flash is a byproduct of the compression molding operation, and is unsightly and undesirable as it could contaminate the hub nose region that interfaces with the front engine seal, causing leaks and failures therein.

SUMMARY

To solve the problems discussed in the background, a new shape for an elastomer member has been developed along with a vertical compression molding method. The new elastomer member/molding method (1) increases the production yield by changing the geometric orientation of the elastomer member in the mold; (2) eliminates the need for de-flashing by changing the location of the flash on the elastomer member; (3) improves the fatigue life of the TVD by decreasing the stress buildup through the profile, and by changing the location of the strain buildup through the profile; and (4) increases the slip-torque capacity of the TVD.

The elastomer members have a first major surface and an opposing second major surface with opposing side joining the first major surface to the second major surface, have a median sagittal plane extending parallel to the first major surface and the second major surface, and a transverse plane perpendicular to the median sagittal plane. In a cross-sectional geometry in a plane bisecting the median sagittal plane and the transverse plane, a thickness of the elastomer member changes along the median sagittal plane in a direction parallel to the transverse plane with a first thickness at both opposing sides and a second thickness at the transverse plane, where the second thickness is greater than the first thicknesses. The elastomer member comprises a flash of material along the length of each of the first and second major surfaces or along the length of each of the opposing sides, depending upon whether a vertical compression mold or a horizontal compression mold is used.

In one aspect, the transverse plane is disposed half way between the opposing sides. The change between the first thickness and the second thickness varies gradually from the first thickness at a first of the opposing sides to the second thickness as a linear function or as a non-linear function representing a single curve or more than one curve.

In one aspect, the opposing sides have generally rounded corners, and the elastomer member is vertically compression molded, which forms a flash of material along the length of each of the first and second major surfaces.

In another aspect, each symmetrical half of the elastomer member in cross-section, relative to the transverse plane, is generally trapezoidally-shaped with the larger of the two generally parallel sides aligned with the transverse plane.

Methods for making the elastomer member described above and herein are disclosed. The methods include providing a vertical compression mold having an upper plate and a lower plate, wherein each of the upper plate and the lower plate include a plurality of spaced apart, elongate channels that are each generally trapezoidally-shaped, when viewed in cross-section transverse to the longitudinal axis, having a larger of two generally parallel sides defining an opening thereof. Then, placing an elastomer material in the lower plate and mating the upper plate to the lower plate to form a plurality of cavities by aligning each one of the channels of the upper plate with one of the channels in the lower plate. Mating the upper plate to the lower plate includes the application of pressure to disperse the elastomer material within the plurality of cavities. Also, the methods may include applying heat and pressure to the upper and lower plates to cure the elastomer material, and/or heating the lower plate before placing the elastomer material therein.

In all aspects, the elastomer material for the elastomer member comprises one or more of a styrene-butadiene rubber, a natural rubber, a nitrile butadiene rubber, an ethylene propylene diene rubber (EPDM), an ethylene acrylic elastomer, a hydrogenated nitrile butadiene rubber, or a polycholoroprene rubber.

Torsional vibration dampers are also disclosed that include the elastomer members described above and herein concentric about a hub and compressed against the hub by an inertia member. In the assembled state, the elastomer member is compressed such that the first thickness is compressed at least 15% and the second thickness is compressed at most 45%.

BRIEF DESCRIPTION OF DRAWINGS

The patent or application file contains at least one drawing executed in color. Copies of this patent or patent application publication with color drawing(s) will be provided by the Office upon request and payment of the necessary fee.

The disclosed invention can be easily understood with reference to the following drawings. The drawings are not necessarily to scale but illustrate the principles of the invention.

DETAILED DESCRIPTION

Reference is now made in detail to the description of the embodiments as illustrated in the figures. While several embodiments are described with these figures, there is no intent to limit the disclosure to the embodiment or embodiments disclosed herein. On the contrary, the intent is to cover all the alternatives, modifications, and equivalents.

Figure 1:
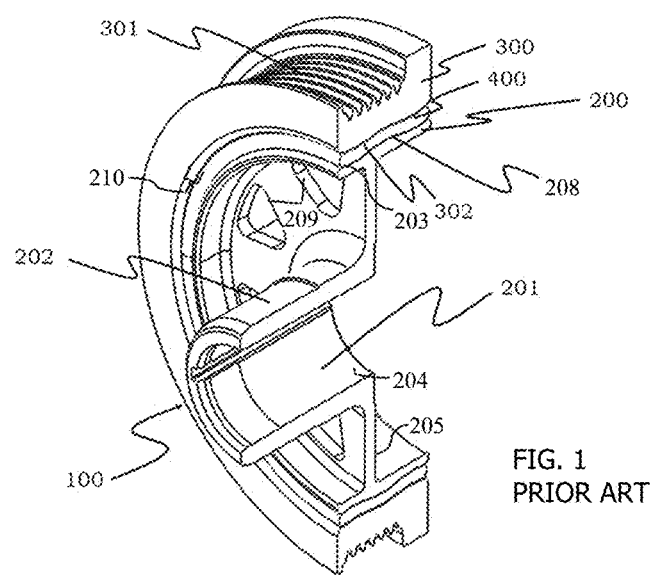
FIG. 1 is a sectional isometric perspective view of a TVD assembly.
Figure 7:
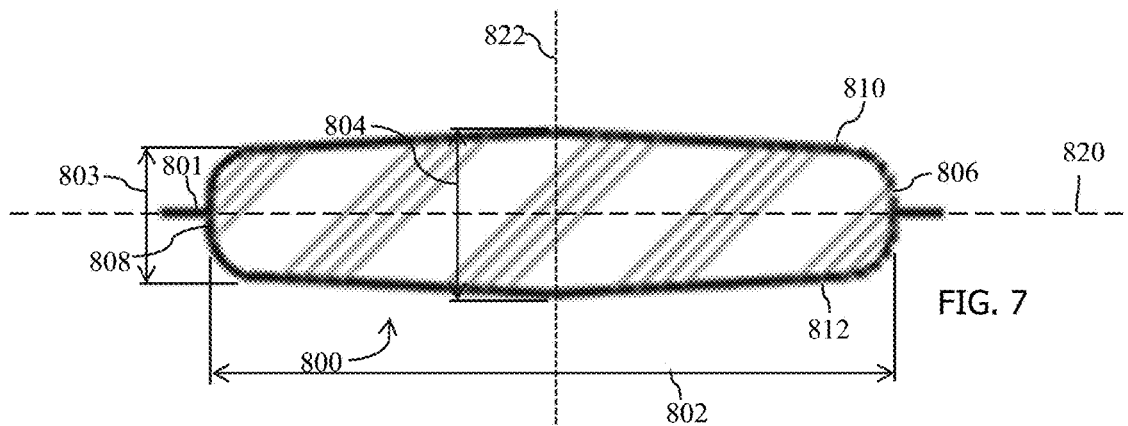
FIG. 7 is a transverse cross-sectional view of a disclosed elastomer member yielded by the horizontal compression mold of FIG. 4.
Figure 8:
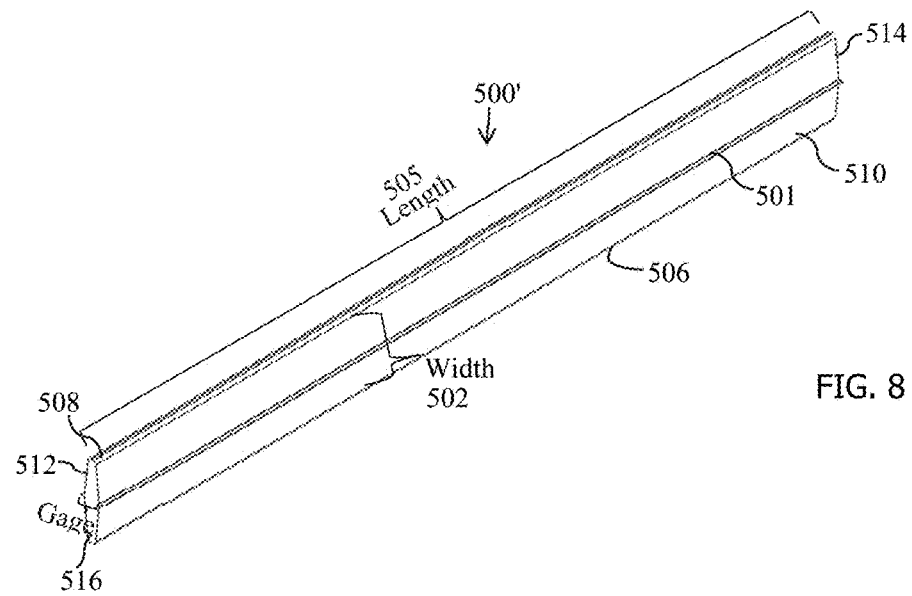
FIG. 8 is a side, perspective view of the disclosed elastomer member yielded by the vertical compression mold of FIG. 5.

A TVD, generally designated by reference 100 in FIGS. 1, 7, and 8, includes a hub 200 defining a generally centrally positioned bore 201 that has an inner cylindrical surface 204 that receives the vibrating shaft, such as the crankshaft of an IC engine, and an outer cylindrical surface 202 that receives the front engine seal. The hub 200 also includes an outermost radial surface 203 spaced radially outward from the bore 201 by a plate 205. The plate 205 may, as seen in FIG. 1, define one or more apertures or open windows 209, and have the portion of the hub 200 defining the bore 201 extending axially therefrom in only one direction, which defines a front face FF of the TVD 100. The opposing side of the plate 205 defines a back face BF of the TVD 100. The hub 102 may be cast, spun, forged, machined, or molded using known or hereinafter developed techniques. Suitable material for the hub includes iron, steel, aluminum, other suitable metals, plastics, or a combination thereof, including composite materials.

The outermost radial surface 203 of the hub 200 may be contoured or non-contoured. Spaced radially outward from the outermost radial surface 203 of the hub 200, and concentric thereabout, is a ring or inertia member 300. The innermost radial surface 302 of the ring 300 is facing the outermost radial surface 203 of the hub 200 and has a contoured or non-contoured surface for mating with the outermost radial surface 203 of the hub 200 with an elastomer member 400 compressed therebetween. A gap 210 is defined between the hub 200 and the ring 300, in which the elastomer member 400 is seated. In FIG. 1, the outermost radial surface 203 is contoured as illustrated, with a peak 208 generally centrally disposed and extending radially outwardly away from the bore 201. The contour may be modeled after a sign wave or other periodic functions. In an embodiment that is non-contoured, the radial surfaces 203 and 302 may be generally smooth annular surfaces both axially and radially as illustrated in the cross-sections shown in FIGS. 7 and 8.

In FIG. 1, the outermost radial surface 203 of the hub 200 includes the peak 208 and two opposing neighboring valleys, which collectively is referred to herein as the hub curve profile. The ring 300 in FIG. 1 has a contoured innermost radial surface 302 that has a mirror image curve profile to that of the outermost radial surface 203 of the hub 200, which is referred to herein as the ring curve profile. The hub curve profile and the ring curve profile are commonly held parallel to each other for uniform compression of the elastomer member 400. The elastomer member 400 is received by the plurality of the surfaces, e.g., valleys, peaks, side walls or slopes therebetween, etc., defined by the hub curve profile and the ring curve profile, and is usually compressed between about 30% to about 40% of its original uncompressed thickness, uniformly through the axial length of the elastomer member 400 to ensure that the elastomer member 400 sufficiently retains the hub 200 and ring 300 in position with respect to one another during assembly and operation, while simultaneously maintaining an acceptable level of stress, strain, and slip-torque within the profile geometry of the compressed elastomer member 400.

The ring 300 includes an outer belt engaging surface 301, which may be flat, contoured to receive a rounded belt, or have V-grooves for mating with the V-ribs of a V-ribbed belt or any other required contoured groove to mate with any other type of endless belt. In FIG. 1, the outer belt engaging surface 301 is illustrated as poly-V grooves for receiving a serpentine belt to drive an FEAD, but is not limited thereto.

Figure 2:
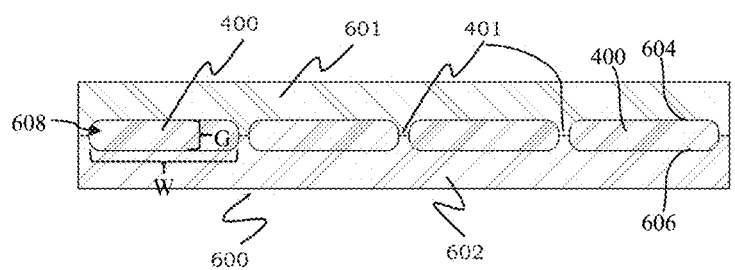
FIG. 2 is a transverse cross-sectional view of a conventional (prior art) compression mold with a plurality of elastomer members in the mold.

FIG. 2 represents an embodiment of a conventional compression mold 600, closed, with a plurality of elastomer members 400 therein. The compression mold 600 includes an upper plate 601 and a lower plate 602, each of which has a plurality of rounded, elongate rectangular channels 604, 606, respectively, that when aligned together in the closed position, define a plurality of cavities 608, each cavity for forming an individual elastomer member 400. The cavities 608, as shown in FIG. 2, have the length of each elastomer member 400 (and hence the cavity) orthogonal to the illustrated view, and are horizontally oriented between the upper plate 601 and lower plate 602. Accordingly, the width W of each elastomer strip 400 is horizontal and the gage G is vertical in the illustrated view. The elastomer members 400 start off as a single mass of uncured rubber cut to a measured weight (pre-form) that gets compressed between the top plate 601 and the bottom plate 602 to form strips. Any excess elastomer, after the cavities are completely filled, flows out of each cavity and forms a flash 401 extending along the length of the strip on opposing sides thereof. As explained in the background above, the flash 401 in this location is generally undesirable because it requires a subsequent step to remove. However, the improved elastomer members disclosed herein may still be manufactured using horizontal compression molding techniques.

Figure 3:
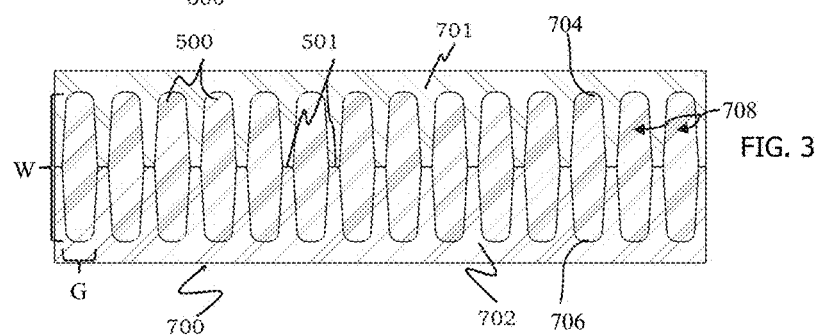
FIG. 3 is a transverse cross-sectional view of one embodiment of a disclosed vertical compression mold with a plurality of elastomer members in the mold.

A better molding method for the elastomer members is represented in FIG. 3. This method is considered better because of the increased yield and elimination of the requirement to remove the flash. Here, a vertical compression mold 700 includes an upper plate 701 and a lower plate 702, each of which has a plurality of rounded trapezoidal channels 704, 706, respectively (when viewed in a transverse cross-section as shown in FIG. 3), that when aligned together in the closed position, define a plurality of cavities 708, each cavity forming an individual elastomer member 400. The cavities 708, as shown in FIG. 3, have the length of each elastomer member 500 (and hence the cavity) orthogonal relative to the view, and are vertically oriented between the upper plate 701 and lower plate 702. Accordingly, the width W of each elastomer strip 500 is vertical and the gage G is horizontal in the illustrated view. Each elastomer member 500 begins as a single mass of uncured rubber cut to a measured weight (preform) that is compressed between the top plate 701 and the bottom plate 702 to fill its respective cavity 708. Any excess elastomer, after the cavity is filled, flows out and forms the flash 501.

Noticeably, the vertical compression mold 700 of FIG. 3 defines more cavities 708, compared to the convention compression mold 600 of FIG. 2 of equal length. Thus, it can be appreciated that the yield per production run is greatly enhanced by transitioning from horizontal (conventional) to vertical molding. In the example presented, this yield increases from 4 elastomer members to 14 elastomer members per mold heat.

Figure 4:
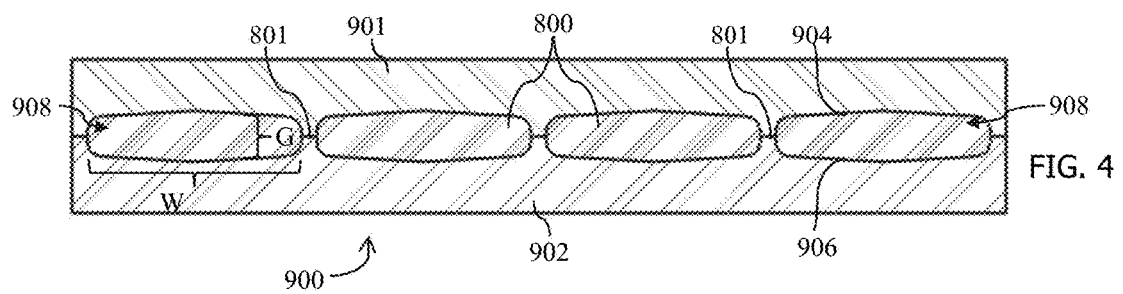
FIG. 4 is a transverse cross-sectional view of one embodiment of a disclosed horizontal compression mold with a plurality of elastomer members in the mold.
Figure 14:
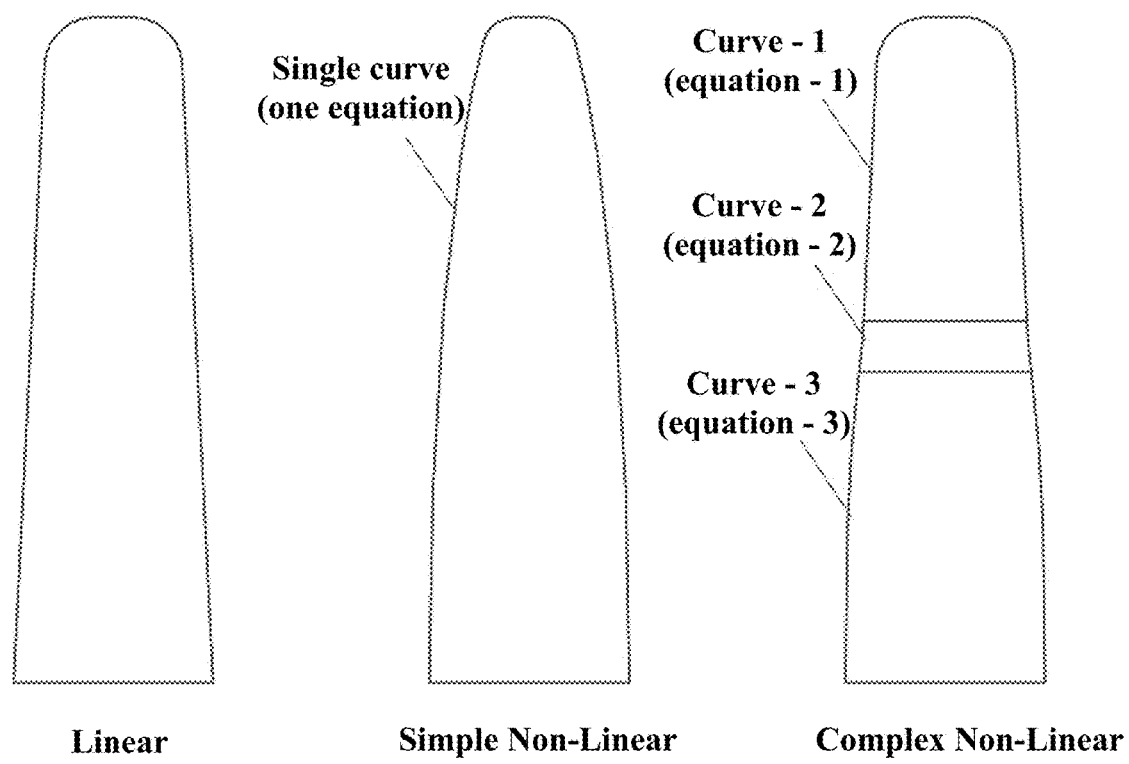
FIG. 14 is an illustration of various embodiments of a converging or diverging portion of an elastomer member having a linear or non-linear function for its thickness.

Even though there are benefits to vertical compression molding of the elastomer members herein, FIG. 4 illustrates that horizontal compression molding is also possible. Here, a horizontal compression mold 900 includes an upper plate 901 and a lower plate 902, each of which have a plurality of channels 904, 906, respectively, that when aligned together in the closed position, define a plurality of cavities 908, each cavity forming an individual elastomer member 800 having an elastomer profile generally as illustrated in FIG. 7 or as illustrated as halves thereof in FIG. 14. The cavities 908, as shown in FIG. 4, have the length of each elastomer member 800 (and hence the cavity) orthogonal to the illustrated view, and are horizontally oriented between the upper plate 901 and lower plate 902. Accordingly, the width W of each elastomer strip 800 is horizontal and the gage G is vertical in the illustrated view. Each elastomer member 800 begins as a single mass of uncured rubber cut to a measured weight (preform) that is compressed between the top plate 901 and the bottom plate 902 to fill its respective cavity 908. Any excess elastomer, after the cavity is filled, flows out and forms the flash 801.

Figure 5:
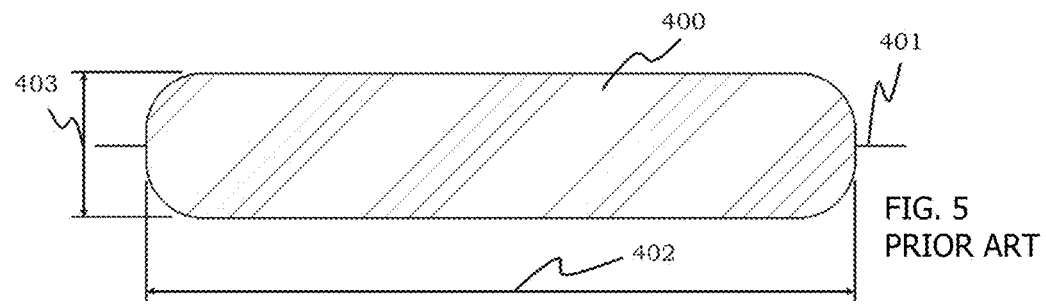
FIG. 5 is a transverse cross-sectional view of an elastomer member yielded by the conventional compression mold of FIG. 2.

FIG. 5 illustrates the conventional elastomer member 400, in cross-section transverse to the longitudinal axis thereof, produced from the conventional compression mold of FIG. 2. The linear dimensions in this view can be defined by a width 402, and a uniform axial thickness 403 (or gage G). The flash 401 is present along the opposing sides that define the uniform axial thickness 403.

Figure 6:
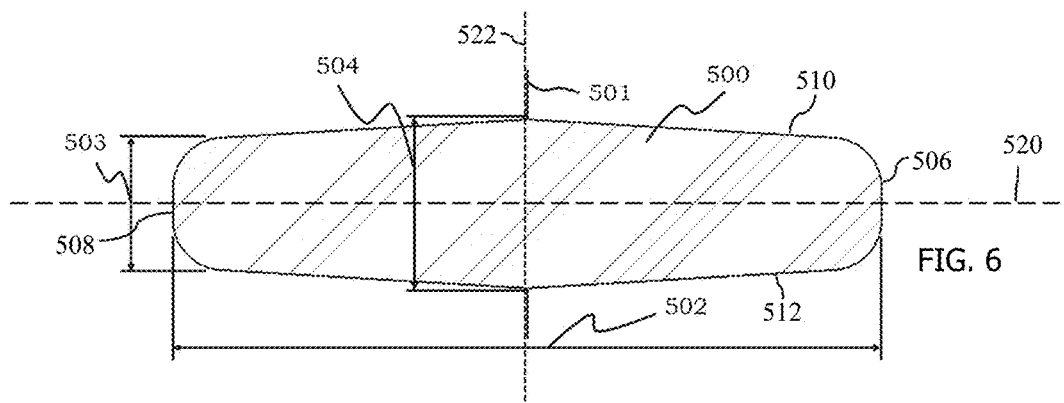
FIG. 6 is a transverse cross-sectional view of a disclosed elastomer member yielded by the vertical compression mold of FIG. 3.

FIG. 6 illustrates the inventive elastomer member 500 in a cross-section, the cross-section being transverse to the length of a strip 500' shown in FIG. 8, which is also a plane bisecting the median sagittal plane 520 and the transverse plane 522 thereof. The elastomer member 500 as illustrated in FIGS. 6 and 8 was produced by the vertical compression mold of FIG. 3, as evidenced by the position of the flash 501 on the first and second major surfaces 510 and 512. The linear dimensions of the elastomer member can be defined by a width 502, a length 505 (FIG. 6), and a varying thickness (or gage). The varying thickness of the elastomer member 500 has a first thickness 503 defined by opposing sides 506, 508 of the elastomeric member 500 that are generally perpendicular to the opposing first and second major surfaces thereof 510, 512 and a second thickness 504 generally at the center of the elastomer member, generally aligned with the transverse plane 522, where the second thickness 504 is larger than the first thickness 503.

FIG. 7 illustrates the inventive elastomer member 800 in a cross-section, the cross-section being transverse to the length of a strip if the mold makes strips thereof or being a cross-section in a plane parallel to the axis of rotation if the mold makes annular rings (not shown) thereof, having a median sagittal plane and a transverse plane, which is also a plane bisecting the median sagittal plane 820 and the transverse plane 822 thereof. The elastomer member 800 was produced by the horizontal compression molding or may be transfer or injection molded in an annular ring-shaped mold. When horizontal compression molding is used, the flash 801 is on the opposing sides 806, 808. The linear dimensions of the elastomer member can be defined by a width 802, a length or diameter (not shown), and a varying thickness (or gage). The varying thickness of the elastomer member 800 is the same or similar to the elastomer member 500 with a first thickness 803 defined by opposing sides 806, 808 that are generally perpendicular to the opposing first and second major surfaces thereof 810, 812 and a second thickness 804 generally at the center of the elastomer member, generally aligned with the transverse plane 822, where the second thickness 804 is larger than the first thickness 803.

In one embodiment, the varying thickness gradually diverges from the first side 806 to the transverse plane 822 and then gradually converges from the transverse plane 822 toward the opposing side 808. The diverging and converging portions of the elastomer member may each have a geometry based on a linear function as shown in the left image of FIG. 14. In another embodiment, the thickness may vary non-linearly in one or more of the diverging and converging portions, for example, as a function of a single curve as shown in the middle image of FIG. 14 or as a more complex non-linear function, such as one involving two or more sequentially disposed curve functions as shown in the right image of FIG. 14. These are non-limiting examples that all result in a first thickness at the opposing sides and a second thickness generally proximate the transverse plane that is larger than the first thickness. Such a configuration of the thickness allows the elastomer member to be compressed generally symmetrically, but non-uniformly through the axial length of the profile. The minimum value of such compression is 15% (at the axial periphery) and the maximum value of such compression is 45% (at the axial center-point).

Figure 9:
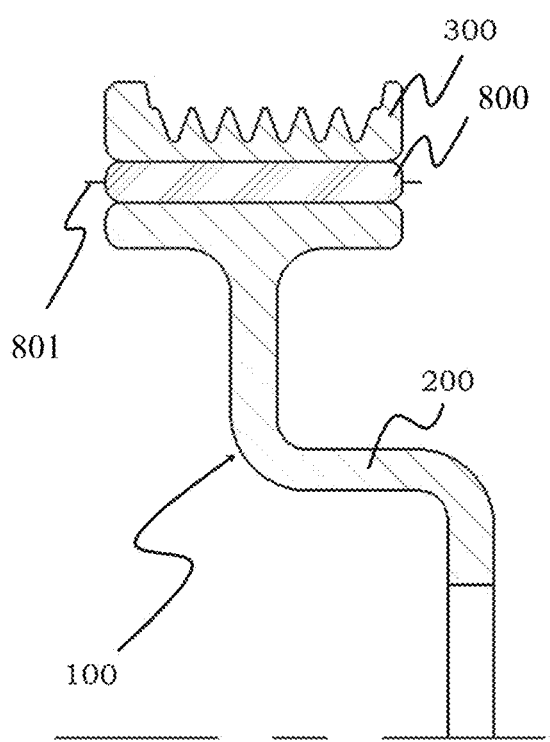
FIG. 9 is a transverse cross-sectional view of an elastomer member yielded by the horizontal compression mold of FIG. 4 after assembly in a torsional vibration damper.
Figure 10:
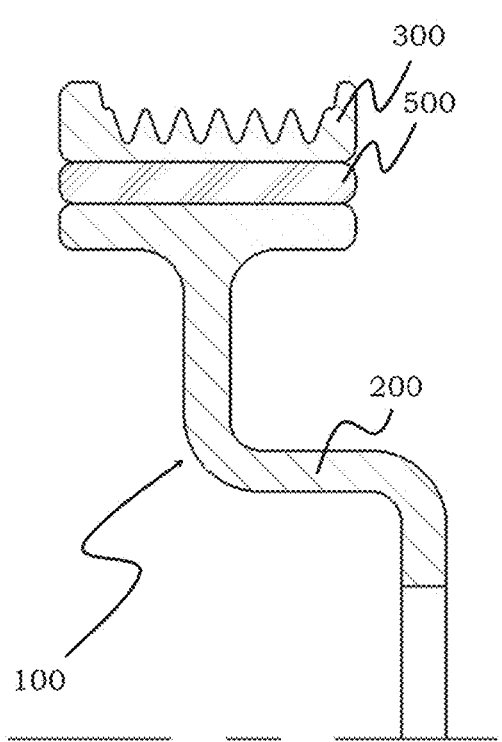
FIG. 10 is a transverse cross-sectional view of a disclosed elastomer member yielded by the vertical compression mold of FIG. 3 after assembly in a torsional vibration damper.

FIGS. 9 and 10 illustrate a TVD in axis-symmetric cross-section 100, with the hub 200, the ring 300, and elastomer members 800, 500, respectively in an installed position therein. The presence of flash 801 is at the surface of the elastomer that is exposed in the installed position in FIG. 9 because the elastomer member was formed using the horizontal compression mold of FIG. 4, and may require an additional manufacturing step to remove the flash. The flash 501 (FIGS. 6 and 8) is not visible in the assembled view of FIG. 10 because the flash 501 is covered by the hub 200 and the ring 300, thereby eliminating the need for the additional step of removing the flashing. The TVD 100 in FIGS. 9 and 10 has a non-contoured profile for the inner radial surface of the ring 300 and for the outermost radial surface of the hub 200, but the invention is not limited thereto. The non-contoured profile was, however, used for the comparative analysis presented in FIGS. 11-13 to demonstrate the difference the shape of the elastomer member 500, 800 has on the performance of the system.

Figure 11:
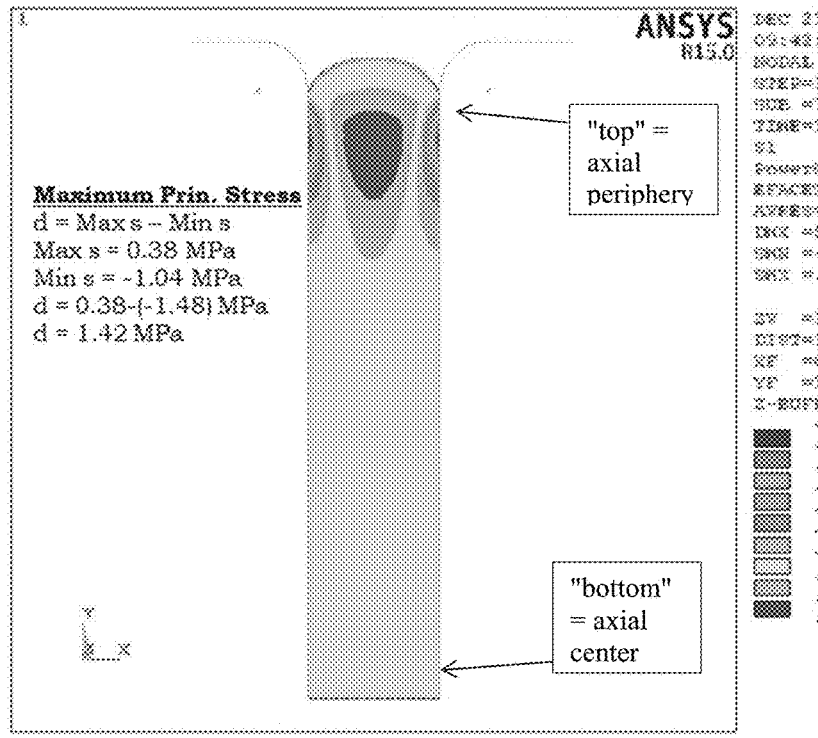
FIG. 11 is a Finite Element Analysis (FEA) maximum principal stress plot comparing the stress buildup in the shape assumed by the elastomer member post-assembly between the prior art and the invention (Red denoting maximum and Blue denoting the minimum level of stress).
Figure 11:
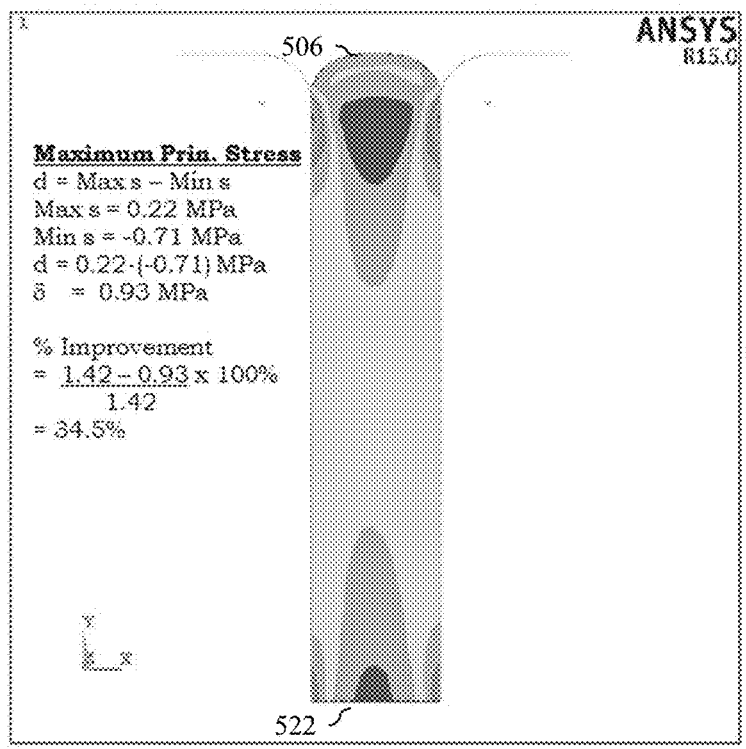

FIG. 11 is a semi-axis-symmetric FEA plot comparing the maximum principal stress buildup in the elastomer member, when viewed as a profile axially, i.e., an assembled cross-section taken parallel to the axis of rotation of a TVD, with the elastomer member compressed between a hub and a ring. The top denotes the axial periphery of the profile, while the bottom denotes the axial center-point (at the transverse plane 522) of the profile. The difference between the maximum value of the maximum principal stress (tension) and the minimum value of the maximum principle stress (compression) yields a quantity called the "stress-delta," which is accepted as a good measure for estimating the fatigue life of the elastomer member in operation. In this illustration, the elastomer member representing prior art (the top image) is given a constant compression of 30% through the axial profile length, while the invention is given a linearly symmetric compression between 20% (at the axial profile periphery) and 40% (at the axial profile center-point). A 34.5% improvement in the stress-delta is illustrated in this example, which means an increase in the fatigue life of the TVD. Note the difference in the distribution of the stresses shown by the location of the colors in the images as well.

Figure 12:
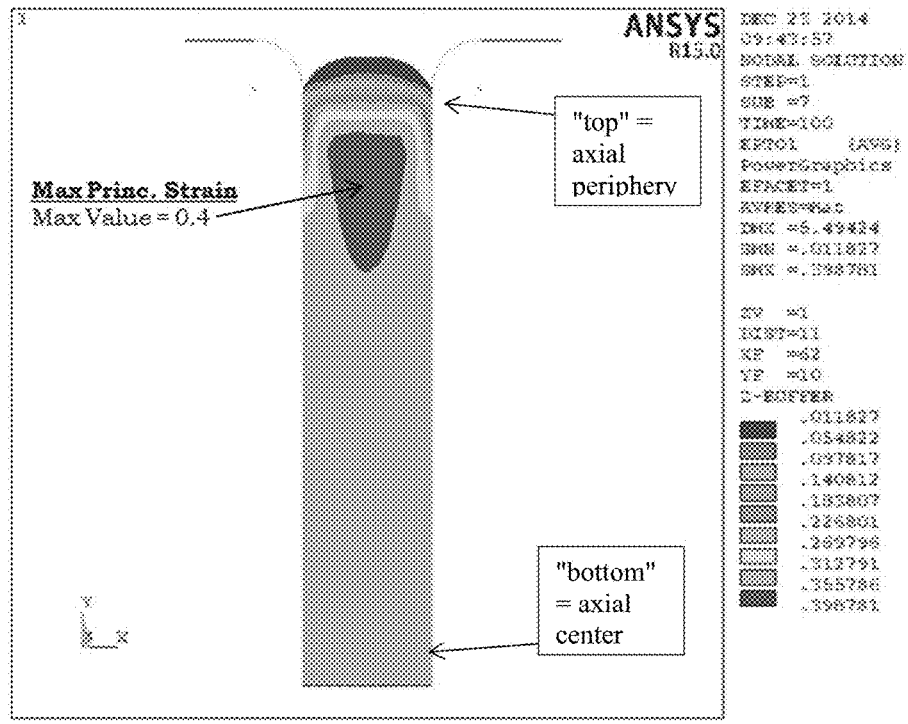
FIG. 12 is an FEA maximum principal strain plot comparing the strain buildup in the shape assumed by the elastomer member post-assembly between the prior art and the invention (Red denoting maximum and Blue denoting the minimum level of strain).
Figure 12:
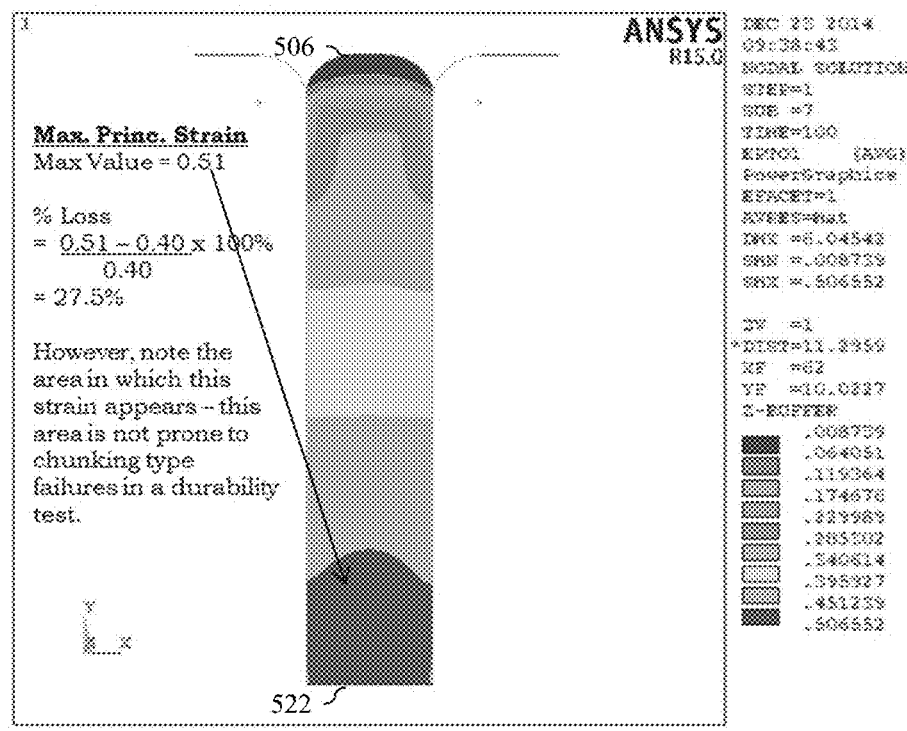

FIG. 12 is a semi-axis-symmetric FEA plot comparing the maximum principal strain buildup in the profile axially. The top denotes the axial periphery of the profile, while the bottom denotes the axial center-point of the profile. The maximum value of the maximum principal strain along with its axial location is accepted as a good measure for estimating the fatigue life of the elastomer member in operation. In this illustration, the elastomer member representing prior art (top image) is given a constant compression of 30% through the axial profile length, while the invention is given a linearly symmetric compression between 20% (at the axial profile periphery) and 40% (at the axial profile center-point). Although the prior art shows a better strain response numerically, maximum principal strain (red area identified by the arrow) is located close to the axial profile periphery, the area more likely to have chunking failures during durability testing. The elastomer member 500 (bottom image) moves the location of the maximum principal strain towards the axial profile centerline, an area not commonly associated with fatigue failures such as chunking failure, thereby reducing the likelihood of chunking failures.

Figure 13:
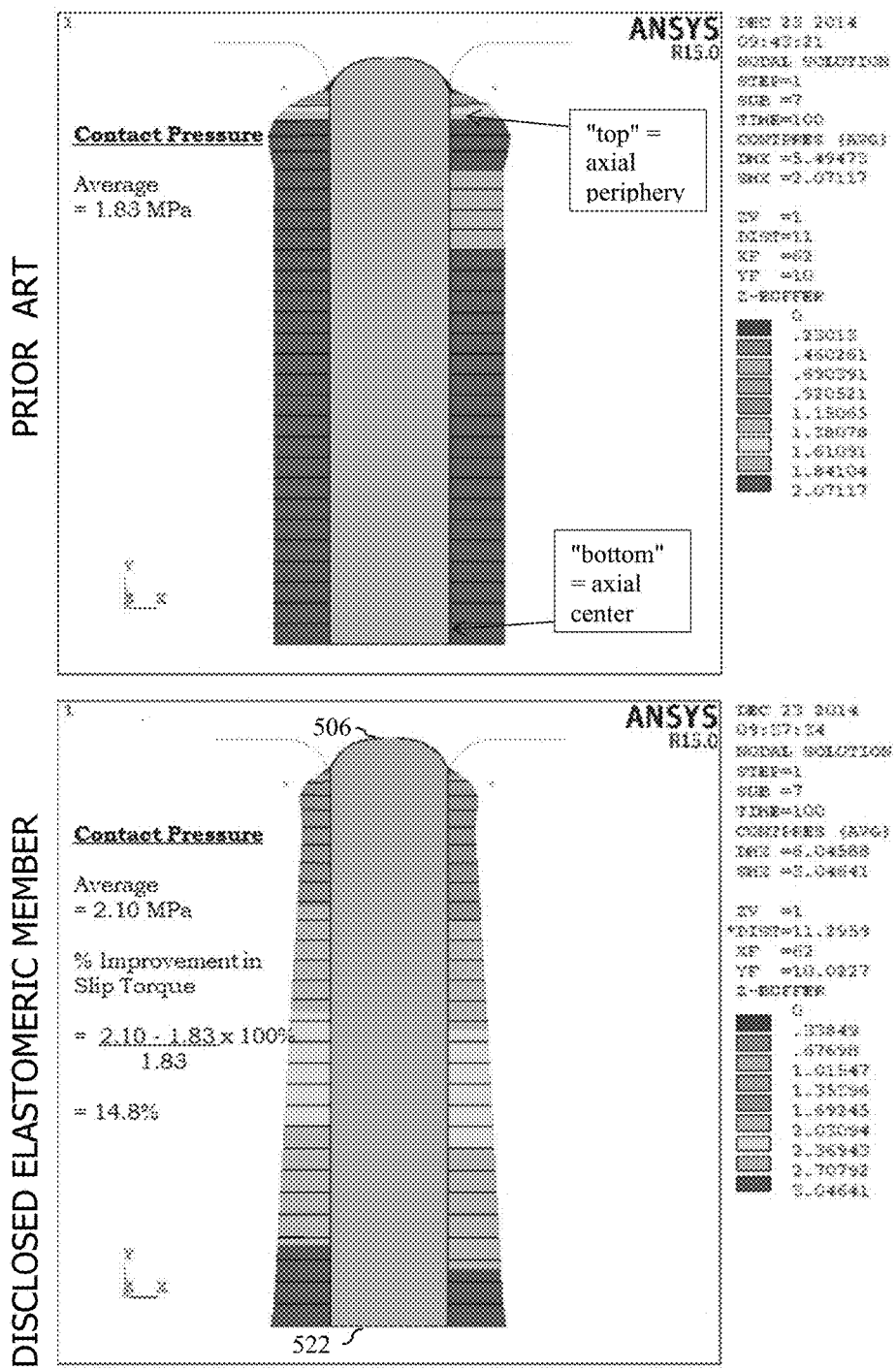
FIG. 13 is an FEA contact pressure plot comparing the contact pressure buildup in the shape assumed by the elastomer member post-assembly between the prior art and the invention (Red denoting maximum and Blue denoting the minimum level of pressure).

FIG. 13 is a semi-axis-symmetric FEA plot comparing the contact pressure buildup in the profile axially. The top denotes the axial periphery of the profile, while the bottom denotes the axial center-point of the profile. The average value of contact pressure is a good measure for estimating the slip-torque capacity of the damper in operation. In this illustration, the elastomer member representing prior art is given a constant compression of 30% through the axial profile length, while the invention is given a linearly symmetric compression between 20% (at the axial profile periphery) and 40% (at the axial profile center-point). A 14.8% improvement in the slip-torque capacity is illustrated in this example.

The results of each of the above tests separately and collectively demonstrate the superior results of the elastomer members disclosed herein.

Using the vertical compression mold 700 of FIG. 3, methods for making an elastomer member for a torsional vibration damper are possible that result in an elastomer member 500 of FIGS. 6 and 8 with a flash 501 of material along the length of each of the first and second major surfaces 510, 512. Referring to FIG. 3, the methods include providing a vertical compression mold 700 having an upper plate 701 and a lower plate 702. Each of the upper plate 701 and the lower plate 702 include a plurality of spaced apart, elongate channels 704, 706 that are each generally trapezoidally-shaped, when viewed in cross-section transverse to the longitudinal axis of the upper and lower plates, having a larger of two generally parallel sides defining an opening thereof. The method includes placing an elastomer material in the lower plate 702 and mating the upper plate 701 to the lower plate 702 to form a plurality of cavities 708 by aligning each one of the channels 704 of the upper plate 701 with one of the channels 706 in the lower plate 702.

When mating the upper plate 701 to the lower plate 702, pressure is typically applied to the mold 700 to disperse the elastomer material within the cavities 708. The method may also include applying heat and pressure to one or more of the upper and lower plates 701, 702 to cure the elastomer material. In one embodiment, the application of heat may include heating the lower plate 702 before placing the elastomer material therein and/or heating the upper plate 701 before placing the elastomer material in the lower plate 702.

These same steps are also suitable for making the elastomer member 800 of FIGS. 4 and 7 using the horizontal compression mold 900, with the option of removing the flash after removal of the elastomer member 800 from the mold.

The elastomer material may include, but is not limited to, any suitable elastomer to absorb and/or damp the torsional vibrations generated by a rotating shaft upon which the torsional vibration damper 100 is mounted. The elastomer material is preferably one suitable for automotive engine applications, i.e., suitable to withstand temperatures experienced in the engine and road temperatures and conditions. In one embodiment, the elastomer material includes one or more of a styrene-butadiene rubber, a natural rubber, a nitrile butadiene rubber, an ethylene propylene diene rubber (EPDM), an ethylene acrylic elastomer, a hydrogenated nitrile butadiene rubber, and a polycholoroprene rubber. One example of an ethylene acrylic elastomer is VAMAC® ethylene acrylic elastomer from E. I. du Pont de Nemours and Company. The elastomeric material may be a composite material that optionally includes a plurality of fibers dispersed therein. The fibers may be continuous or fragmented (chopped) aramid fiber like the fiber sold under the name TECHNORA® fiber.

Although the invention is shown and described with respect to certain embodiments, it is obvious that modifications will occur to those skilled in the art upon reading and understanding this specification, and the present invention includes all such modifications.

What is claimed is:

1. An elastomer member for a torsional vibration damper comprising:
   a first major surface and an opposing second major surface with opposing side joining the first major surface and the second major surface;
   wherein the elastomer member has a median sagittal plane extending parallel to the first major surface and the second major surface, and a transverse plane perpendicular to the median sagittal plane;
   wherein, in a cross-sectional geometry in a plane bisecting the median sagittal plane and the transverse plane, a thickness of the elastomer member changes along the median sagittal plane in a direction parallel to the transverse plane, a first thickness being at both of opposing sides and a second thickness being generally at the transverse plane;
   wherein the second thickness is greater than the first thicknesses; and
   wherein the change between the first thickness and the second thickness varies gradually from the first thickness at a first of the opposing sides to the second thickness as a linear function.

2. The elastomer member of claim 1, wherein the transverse plane is disposed half way between the opposing sides.

3. The elastomer member of claim 1, further comprising a flash of material along the length of each of the first and second major surfaces.

4. The elastomer member of claim 1, further comprising a flash of material along the length of each of the opposing sides.

5. The elastomer member of claim 1, wherein the opposing sides have generally rounded corners.

6. The elastomer member of claim 5, wherein the elastomer member is vertically compression molded thereby having a flash of material along the length of each of the first and second major surfaces.

7. An elastomer member for a torsional vibration damper comprising:
   a first major surface and an opposing second major surface with opposing side joining the first major surface and the second major surface;
   wherein the elastomer member has a median sagittal plane extending parallel to the first major surface and the second major surface, and a transverse plane perpendicular to the median sagittal plane;
   wherein, in a cross-sectional geometry in a plane bisecting the median sagittal plane and the transverse plane, a thickness of the elastomer member changes along the median sagittal plane in a direction parallel to the transverse plane, a first thickness being at both of opposing sides and a second thickness being generally at the transverse plane;
   wherein the second thickness is greater than the first thicknesses; and
   wherein each symmetrical half of the elastomer member in cross-section, relative to the transverse plane, is generally trapezoidally-shaped with the larger of the two generally parallel sides aligned with the transverse plane.

8. The elastomer member of claim 7, wherein the change between the first thickness and the second thickness from the first thickness at a first of the opposing sides to the second thickness varies as a non-linear function representing a single curve or more than one curve.

9. A method for making an elastomer member for a torsional vibration damper, the method comprising:
providing a vertical compression mold having an upper plate and a lower plate, wherein each of the upper plate and the lower plate include a plurality of spaced apart, elongate channels that are each generally trapezoidally-shaped, when viewed in cross-section transverse to the longitudinal axis, having a larger of two generally parallel sides defining an opening thereof;
placing an elastomer material in the lower plate;
mating the upper plate to the lower plate to form a plurality of cavities by aligning each one of the channels of the upper plate with one of the channels in the lower plate.

10. The method of claim 9, wherein mating the upper plate to the lower plate includes the application of pressure to disperse the elastomer material within the plurality of cavities.

11. The method of claim 10, further comprising applying heat and pressure to the upper and lower plates to cure the elastomer material.

12. The method of claim 9, further comprising heating the lower plate before placing the elastomer material therein.

13. The method of claim 9, wherein the elastomer material comprises one or more of a styrene-butadiene rubber, a natural rubber, a nitrile butadiene rubber, an ethylene propylene diene rubber (EPDM), an ethylene acrylic elastomer, a hydrogenated nitrile butadiene rubber, or a polycholoroprene rubber.

14. A torsional vibration damper comprising:
an elastomer member of claim 1 concentric about a hub and compressed against the hub by an inertia member.

15. The torsional vibration damper of claim 14, wherein the first thickness is compressed at least 15% and the second thickness is compressed at most 45%.

16. An elastomer member for a torsional vibration damper comprising:
an annular ring of elastomeric material having an elastomer profile, viewed as a cross-section in a plane parallel to an axis of rotation, having a median sagittal plane extending parallel to a first major surface and a second major surface of the elastomer member, and a transverse plane perpendicular to the median sagittal plane, the elastomer profile having a thickness that changes along the median sagittal plane in a direction parallel to the transverse plane with a first thickness at both of the opposing sides and a second thickness at the transverse plane;
wherein the second thickness is greater than the first thicknesses; and
wherein the change between the first thickness and the second thickness varies gradually from the first thickness at a first of the opposing sides to the second thickness as a linear function.

17. The elastomer member of claim 16, wherein the transverse plane is disposed half way between the opposing sides.

18. The elastomer member of claim 16, wherein the change between the first thickness and the second thickness from the first thickness at a first of the opposing sides to the second thickness varies as a non-linear function representing a single curve or more than one curve.

* * * * *